Patented May 5, 1953

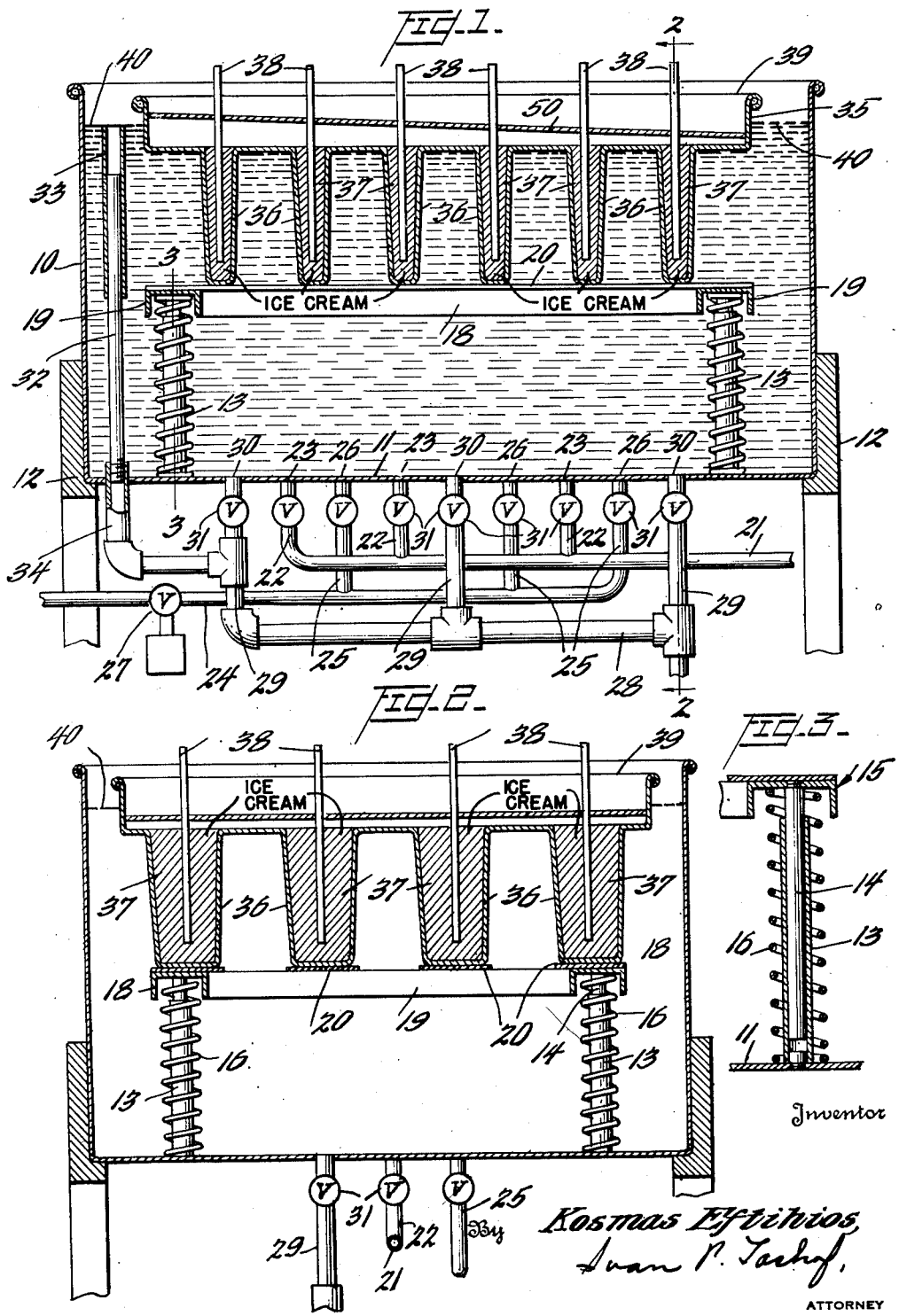

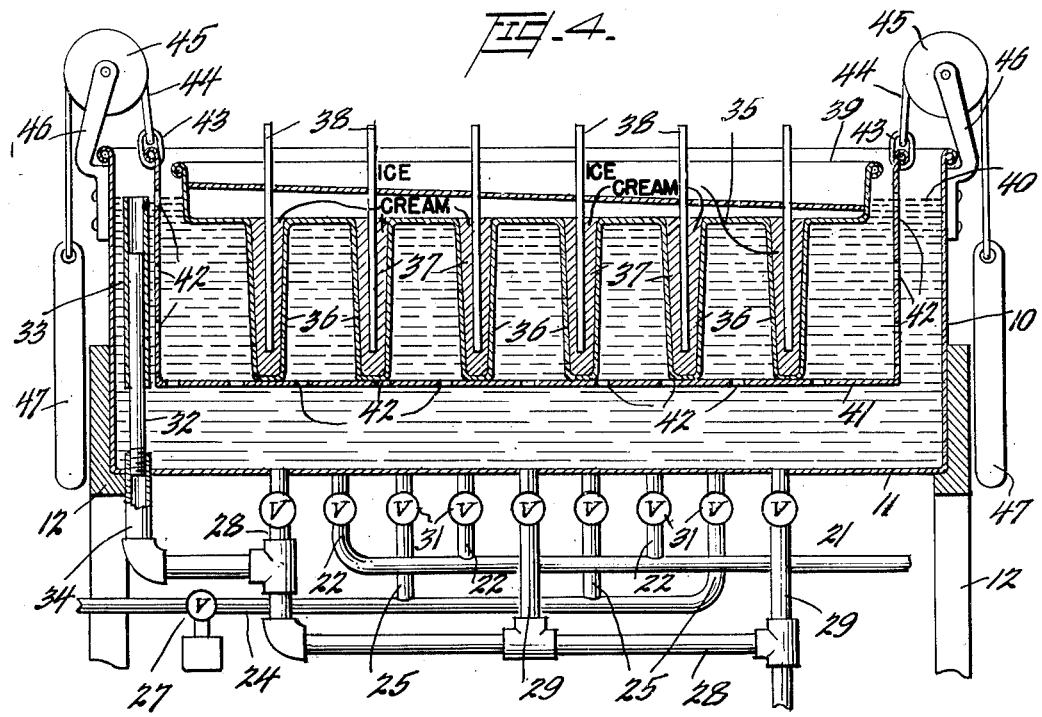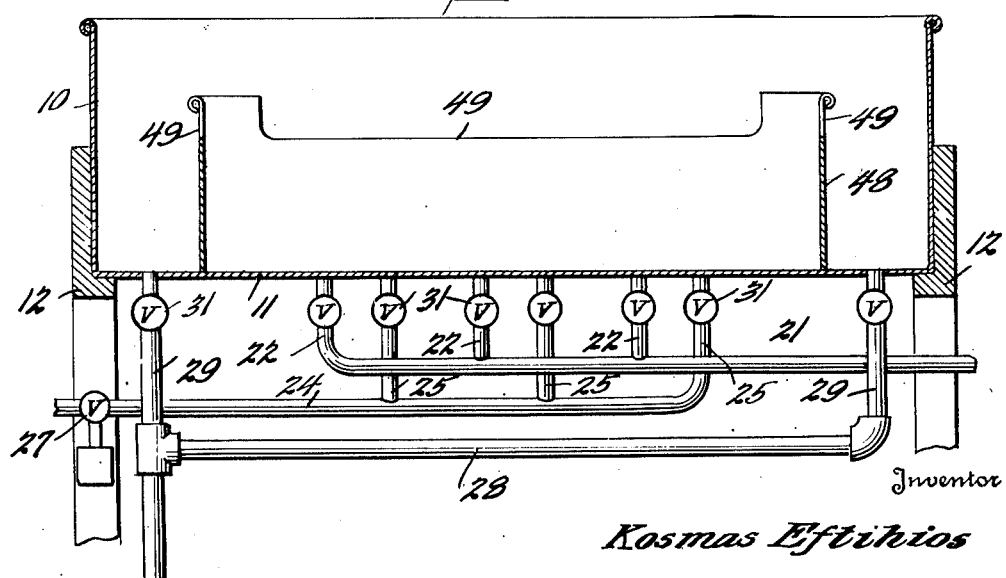

2,637,668

UNITED STATES PATENT OFFICE 2,637,668

METHOD AND APPARATUS FOR RELEASING FROZEN CONFECTIONS FROM MOLDS

Kosmas Eftihios, New Orleans, La.

Application July 19, 1948, Serial No. 39,554

8 Claims. (Cl. 134—5)

The present invention relates to improvements in the method and apparatus for releasing frozen confections from molds and has for an object the provision of a method and an apparatus of this character by which the frozen confection can be quickly reelased from the mold by an unskilled person without danger of spoiling the confection.

It has been the practice in the making of frozen confections which are mounted on a stick such as "popsicles" and "Eskimo pies" to pour the ice cream in liquid form into molds which carry the sticks. Each of these molds are usually divided into twenty-four individual compartments. These twenty-four individual compartments are immersed in a brine bath or solution to freeze the liquid ice cream until it has reached the desired hardness. In order to remove the frozen confection it has been found expedient to introduce the molds into a bath of warm or hot water to soften the outer film of the frozen confection to permit ready removal of the confection from the molds.

In this process a considerable amount of the brine solution adheres to the outer face of the individual compartments and when the molds are introduced to the warm bath the brine solution which has adhered to the molds is washed off by the warm water and contaminates the warm water bath. In the prior art structure, it has been the practice to use the same bath without changing the water throughout an entire working day so that the water becomes stagnant. Since about 120 molds per hour are introduced into the warm bath, the percentage of the brine content of the stagnant water will rapidly increase and may reach six per cent to eight per cent. When the water of the bath is splashed over the molds into the frozen confection therein the brine content of the water bath will be so high that the frozen confecticn in that set of molds will be spoiled and rendered unfit for human consumption. The refrigerating brine solution may also contain a corrosion inhibitor as, for example, potassium dichromate, formaldehyde, and the like, in amounts varying between one-half to one per cent by weight taken on the weight of the brine solution. These inhibitors function to prevent the molds present in the brine bath from being corroded by the brine bath. The presence of these inhibitors furnishes an additional reason why the softening bath should be a flowing bath which constantly removes the droplets of brine introduced into the softening bath when the molds are inserted therein. While the molds are provided with a lid 50, there is still the possibility of careless operators immersing the molds in the softening bath, thereby allowing a portion of the softening bath to seep through at the point of contact of the lid with the side walls of the molds and thereby contaminate the frozen confection, such as ice cream.

It is one of the objects of the present invention to overcome this disadvantage of the prior art which has caused and is continuing to cause great waste of food materials and time. This object is accomplished by keeping to a negligible amount the brine content of the warm fluid bath so that it seldom reaches a concentration of one to ten parts of brine per ten thousand parts of water by weight. In accordance with the present invention this accumulation of the brine content of the warm or hot fluid bath is prevented by subjecting the mold to the action of continuously flowing warm or hot fluid for continuously removing the droplets of brine which are introduced into the fluid bath by the mold so that the bath does not build up a brine concentration imparting thereto a salty or briny taste.

The present invention has as another object the provision of an improved method of apparatus for continually introducing warm or hot fluid into the tank into which the molds containing the frozen confection are introduced and for continually discharging the water of the bath from the tank. With such an arrangement the water of the bath which has been subjected to the brine-laden molds is continuously being carried from the tank and a fresh supply of water is being furnished to the bath.

A further object of the present invention is to provide an improved apparatus of this kind which insures that the mold containing the frozen confection cannot be immersed in the hot water bath to such a depth that the water bath will overflow over the upper edge of the mold and into the frozen confection.

A still further object of the present invention is to provide an improved apparatus of this character which is simple in construction, economical to manufacture and contains few moving parts to wear out or get out of order.

With the foregoing and other objects in view, the invention will be hereinafter more fully described and more particularly pointed out in the appended claims.

In the drawings, in which the same parts are denoted by the same reference numerals throughout the several views, Figure 1 is a longitudinal sectional view of the improved apparatus with parts shown in elevation and parts broken away.

Figure 2 is a transverse vertical sectional view on the line 2—2 of Figure 1.

Figure 3 is a transverse vertical sectional view on the line 3—3 of Figure 1.

Figure 4 is a longitudinal sectional view of a modified form of the invention with parts shown in elevation and parts broken away, and Figure 5 is a longitudinal sectional view of another modified form of the invention with parts shown in elevation and parts broken away.

Referring more particularly to Figures 1, 2 and 3 of the drawings 10 indicates a tank having a bottom 11 and which rests upon a supporting member 12. Disposed within the tank 10 and mounted upon the bottom 11 thereof are four vertically extending tubes 13 which telescopically receive legs 14 carried at each corner of a table or platform 15. A coil spring 16 surrounds each of the tubes 13 and legs 14. The lower end of each spring 16 engages the bottom 11 of the tank 10 and the upper end of each spring bears against the bottom of the platform. The table or platform 15 is of skeleton formation having side pieces 18 and end pieces 19 preferably formed of inverted channel bars, and spaced apart flat bars 20 supported by the side pieces 18 and end pieces 19. The upper ends of the spring 16 seat in the channel bars.

Cold water is supplied to the tank 10 by means of a pipe 21 and branch pipes 22 which communicate with the interior of the tank 10 through suitable openings 23 in the bottom 11 of the tank 10. The cold water pipe 21 is connected to a suitable source of water supply. For the purpose of heating the cold water in the tank 10 steam from a suitable source of supply is introduced into the interior of the tank 10 by pipes 24 and branch pipes 25. This pipe 24 and branch pipes 25 communicate with the interior of the tank 10 through appropriate openings 26 in the bottom 11 of the tank 10. A thermostatic valve 27 is disposed within the steam pipe 24 to automatically control the flow of steam to the tank 10.

A discharge pipe 28 having branches 29 communicates with the interior of the tank 10 through suitable openings 30 in the bottom 11 of the tank 10. Appropriate valves 31 are disposed within the cold water pipe 21 and its branches 22, the steam pipe 24 and its branches 25 and the discharge pipe 28 and its branches 29 for controlling the flow of the fluid therethrough.

An overflow pipe comprising telescopic sections 32 and 33 is disposed within the tank 10 and the lower end of the section 32 is connected to a pipe 34 which is received by an opening in the bottom 11 of the tank 10. The pipe 34 connects with the discharge pipe 28. A mold 35 has a plurality of individual compartments 36 which contain a frozen confection 37 in which is embedded a stick 38. The mold 35 has a cover 50 which has a plurality of openings for the reception of the sticks 38.

In the operation of the form of the invention shown in Figures 1, 2 and 3 when the valves 31 are in open position cold water will be supplied to the interior of the tank 10 through cold water pipe 21 and its branches 22. At the same time steam will be conducted to the interior of the tank 10 by the steam pipe 24 and its branches 25. The continuous flow of the water and the steam into and out of the tank 10 will be effected by the discharge pipe 28 and its branches 29 and the fluid level of the bath within the tank 10 will be controlled by the selected position of the telescopic section 33 of the overflow pipe. The water which is introduced into the tank 10 is heated by the steam to a temperature between 150° and 195° F.

The mold 35 which carries a number of the frozen confections is then introduced into the tank 10 so that the bottoms of the compartments 36 engage the bars 20 of the table or platform 15. The table or platform 15 is in its elevated position due to the influence of the coil springs 16. In order to immerse the mold 35 to the proper depth the operator places the mold 35 upon the table 15. The weight of the loaded mold and the table overcomes the action of the coil springs 16 and the table is moved downwardly so that the compartments 36 are immersed in the hot bath. The upper edge 39 of the mold 35 is disposed above the liquid level 40 of the fluid in the tank 10 so that the water of the bath will not ordinarily flow over the top edge 39 of the mold 35 and into engagement with the frozen confections 37 in the compartments 36. With this arrangement even when used by an unskilled operator the water of the bath will rarely overflow on to the frozen confection.

The molds 35 are introduced sequentially at the rate of two molds per minute. Since the ice cream confection has previously been frozen in a brine solution which is both salty and bitter as it contains both sodium and calcium chloride and the molds are introduced immediately and directly from the brine solution, droplets of brine solution adhere to the outer faces of the molds and are carried thereby into the hot bath in the tank 10. The water of the bath in the tank 10 washes off these droplets of brine solution but the concentration of the brine in the water of the bath is kept between one to ten parts per ten thousand parts of water by the continuous flow of the hot fluid of the bath into and out of the tank 10.

In the modification of the invention shown in Figure 4, a receptacle 41 is substituted for the table or platform 15. The receptacle 41 has perforations 42 in the bottom and sides thereof so that the water of the hot fluid bath can flow into and out of the receptacle. The receptacle 41 at the upper edge of each of its corners carries a link 43 to which one end of a chain 44 is attached. The chain 44 is trained over a pulley 45 which is rotatably mounted upon a pulley bracket 46 secured to the side of the tank 10. The opposite end of the chain 44 has attached thereto a counterweight 47.

The operation of the modified form of the invention illustrated in Figure 4 is similar to that described in connection with the form of the invention shown in Figures 1, 2, and 3, except that the receptacle 41 is normally maintained in elevated position by the counterweights 47 instead of the springs 16. The counterweights are of such a weight that, when a loaded mold 35 is placed within the receptacle 41, the compartments 36 of the mold will be immersed in the hot fluid bath but the upper edge 39 of the mold will be above the fluid level 40.

In the modification of the invention illustrated in Figure 5 a container 48 is substituted for the table or platform 15 or the receptacle 41. The container 48 is secured to the bottom 11 of the tank 10. The sides and ends of the container 48 are cut away as indicated at 49 to provide a weir for permitting the water of the hot fluid bath to flow into and out of the container and around the mold 35 when the mold is introduced into the container 48.

The operation of this form of the invention is similar to that described above in connection with the modifications shown in Figures 1 to 3 and Figure 4 except that it is merely necessary to place the mold 35 in the container 48 with the bottom of the mold resting upon the bottom of the container. The depth of the container 48 is such that the compartments 36 of the loaded mold 35 will be immersed in the bath but the upper edge 39 of the mold will be above the fluid level 40.

The cost of producing the steam is more than compensated for in economies effected by the preventing of the spoilage of the frozen confections due to the splashing of the salty and bitter solution which takes place in the prior art structures. However, instead of introducing water and steam into the tank 10, warm water having a temperature varying between 150° and 195° F. and preferably between 160° and 190° F. may be introduced directly into the tank.

In accordance with the present invention, there has been provided a method of softening for quick release a series of individually frozen confections contained in a mold container, said molds being immersed in a hot fluid bath which is usually an aqueous bath. The contents of the mold has been frozen in a brine solution. Each of these molds has adhering thereto prior to immersion in the softening bath droplets of brine solution. From a method standpoint, the advance in the art is in the step comprising preventing accumulation of brine content in the softening bath imparting a salty taste to the bath on the sequential introduction of the molds into the softening bath by subjecting the molds to the action of a continuously flowing hot fluid softening bath which continuously removes the droplets of brine from the surface of each mold, said brine being soluble in the softening bath.

In carrying out the invention while separate conduit means may be provided for continuously supplying cold water and steam to the tank, it is within the contemplation of the present invention to provide means for continuously supplying the tank with flowing warm water and, of course, also provide means for continuously removing a part of said flowing water from the tank.

The refrigerating medium or so-called brine solution is the prior art brine solution consisting of sodium chloride, calcium chloride or mixtures thereof in portions well known by prior art workers.

It is obvious that various changes and modifications may be made in the details of construction and design of the above specifically described embodiment of the present invention without departure from the spirit thereof, such changes and modifications being restricted only by the scope of the following claims.

What I claim is:

1. In an apparatus for releasing frozen confections from mold sections of a mold member, the contents of which have been frozen in a brine solution, each of said mold sections having adhering thereto droplets of brine, the combination of a tank adapted to receive a hot fluid bath, a platform mounted within said tank for vertical movement therein and adapted to support the mold sections containing the frozen confections as they are sequentially introduced into said tank, a plurality of springs disposed between the bottom of the tank and the platform for normally urging the platform to its elevated position and for limiting the downward movement of the platform when a mold containing the frozen confections is deposited upon the platform, automatic means for maintaining the hot fluid bath at a predetermined level below the upper edge of the mold member, and a plurality of legs having telescopic sections each of which is surrounded by one of said springs, one of the telescopic sections being mounted on the platform and the other telescopic section being mounted on the bottom of the tank.

2. In an apparatus for releasing frozen confections from mold sections of a mold member, the contents of which have been frozen in a brine solution, each of said mold sections having adhering thereto droplets of brine, the combination of a tank adapted to receive a hot fluid bath, a platform mounted within said tank for vertical movement therein and adapted to support the mold sections containing the frozen confections as they are sequentially introduced into said tank, a plurality of springs disposed between the bottom of the tank and the platform for normally urging the platform to its elevated position and for limiting the downward movement of the platform when a mold member containing the frozen confections is deposited upon the platform so that the portion of the mold member containing the frozen confections is immersed in the hot fluid bath and the upper edge of the mold member is maintained at a level above the level of the hot fluid bath in the tank, a plurality of legs having telescopic sections each of which is surrounded by one of said springs, one of the telescopic sections being mounted on the platform and the other telescopic section being mounted on the bottom of the tank, means for continuously supplying said tank with flowing warm water, means for continuously removing a portion of said flowing water after it has been contaminated with droplets of brine, and automatic means for maintaining the fluid level in the softening bath below the upper edge of the mold.

3. The method of softening for quick release a frozen confection contained in molds comprising immersing said molds having adhering thereto prior to immersion in the softening bath droplets of brine solution comprising sequentially introducing the molds into a hot fluid bath to soften the frozen contents of the molds while resiliently and telescopically supporting for limited downward movement the molds within said bath with those portions of the molds containing the frozen confection immersed in the hot liquid and the upper edge of each of the molds at a level above the level of the hot liquid to prevent overflow of the hot fluid bath onto the frozen confection and maintaining the hot fluid bath at a predetermined level by continuously supplying thereto flowing warm water and continuously removing a portion of the hot bath.

4. In an apparatus for releasing frozen confections from mold sections of a mold member, the contents of which have been frozen in a brine solution, each of said mold sections having adhering thereto on its outer face droplets of the brine solution, the combination of a tank adapted to receive a fluid softening bath, a supporting member mounted within said tank for vertical movement therein and adapted to support the mold sections containing frozen confections as they are introduced into the tank, a plurality of springs disposed between the bottom of the tank and the supporting member and normally urging said supporting member to its elevated position and limiting the downward movement of the supporting member when a mold containing the frozen confections is supported upon said supporting member so that the portion of the mold containing the frozen confections is immersed in the bath and the upper edge of the mold is maintained at a level above the level of the fluid bath in the tank, a plurality of legs having telescopic sections each of which is surrounded by one of said springs, one of the telescopic sections being mounted on said supporting member, and the other of said telescopic sections being mounted on the bottom of the tank, means for continuously supplying said tank with flowing warm water, means for continuously removing a portion of said flowing water after it has been contaminated with droplets of brine, and means for automatically maintaining the hot fluid bath at a predetermined level below the upper edge of the mold.

5. The apparatus defined in claim 4 in which the means for maintaining the hot fluid bath at a predetermined level below the upper edge of the mold comprises an overflow pipe having two telescopic sections, one of which is connected to the means for removing a portion of the flowing water.

6. The apparatus defined in claim 4 in which the supporting member is a platform comprising spaced end members, spaced side members, and spaced intermediate members adapted to support said mold sections, said intermediate members being mounted on said side members, said platform being mounted for vertical movement in said tank.

7. The apparatus defined in claim 4 in which the supporting member is a platform mounted in the tank for vertical movement and comprises end members, spaced side members between said end members and spaced intermediate members adapted to support said mold sections, said intermediate members being mounted on said side members, each of said end members being provided with a seat for a pair of said springs.

8. In an apparatus for releasing frozen confections from sections of a mold member, the contents of which have been frozen in a brine solution, each of said mold sections having adhering thereto on its outer face droplets of brine solution, the combination comprising a tank having a fluid softening bath therein, a supporting member immersed in said softening bath, a mold member having mold sections containing frozen confections mounted on said supporting member, a cover for the mold sections, said mold member being at least partially immersed in the softening bath present in the tank, a plurality of spaced springs disposed between the bottom of the tank and the supporting member and normally urging said supporting member to its elevated position, means connected to the supporting means and cooperating with said springs for limiting the downward movement of said supporting means, means for continuously supplying said tank with flowing warm water, means for continuously removing a portion of said flowing warm water having a brine-content, and automatic means for maintaining the softening bath at a predetermined level below the upper portion of the mold member.

KOSMAS EFTIHIOS.

References Cited in the file of this patent

UNITED STATES PATENTS

| Number | Name | Date |
|---|---|---|
| 393,671 | Sloan | Nov. 27, 1888 |
| 552,210 | Stone | Dec. 31, 1895 |
| 1,477,068 | Magann | Dec. 11, 1923 |
| 1,678,252 | Kendall | July 24, 1928 |
| 1,706,938 | Roberts | Mar. 26, 1929 |
| 1,877,843 | Gatchell | Sept. 20, 1932 |
| 2,085,075 | Delano | June 29, 1937 |
| 2,106,893 | Krein | Feb. 1, 1938 |
| 2,109,822 | Eddy | Mar. 1, 1938 |
| 2,123,215 | Thomas | July 12, 1938 |
| 2,179,225 | Thomas | Nov. 7, 1939 |
| 2,263,963 | Barry | Nov. 25, 1941 |
| 2,289,312 | Whitesell | July 7, 1942 |
| 2,289,890 | Walter | July 14, 1942 |
| 2,432,584 | Paulson | Dec. 16, 1947 |
| 2,463,307 | Price | Mar. 1, 1949 |